United States Patent
Creviston et al.

(10) Patent No.: US 10,164,492 B2
(45) Date of Patent: Dec. 25, 2018

(54) ELECTRIC MACHINE HAVING ELECTRICAL BUSS AND MANUFACTURING METHOD THEREFOR

(71) Applicant: Remy Technologies, LLC, Pendleton, IN (US)

(72) Inventors: Alex Creviston, Muncie, IN (US); Chris Bledsoe, Anderson, IN (US)

(73) Assignee: BORGWARNER INC., Auburn Hills, MI (US)

(*) Notice: Subject to any disclaimer, the term of this patent is extended or adjusted under 35 U.S.C. 154(b) by 557 days.

(21) Appl. No.: 14/716,547

(22) Filed: May 19, 2015

(65) Prior Publication Data

US 2015/0256040 A1 Sep. 10, 2015

Related U.S. Application Data

(63) Continuation of application No. PCT/US2013/073078, filed on Dec. 4, 2013.

(60) Provisional application No. 61/733,263, filed on Dec. 4, 2012.

(51) Int. Cl.

| | |
|---|---|
| H02K 11/00 | (2016.01) |
| H02K 3/28 | (2006.01) |
| H02K 5/22 | (2006.01) |
| H02K 11/04 | (2016.01) |
| H02K 15/00 | (2006.01) |
| H02K 11/30 | (2016.01) |

(52) U.S. Cl.
CPC ............... *H02K 3/28* (2013.01); *H02K 5/225* (2013.01); *H02K 11/046* (2013.01); *H02K 11/30* (2016.01); *H02K 15/0062* (2013.01); *Y10T 29/49012* (2015.01)

(58) Field of Classification Search
CPC ........ H02K 5/225; H02K 11/046; H02K 3/28; H02K 11/30; H02K 15/0062
USPC .......................................................... 310/71
See application file for complete search history.

(56) References Cited

U.S. PATENT DOCUMENTS

| | | |
|---|---|---|
| 2002/0033646 A1 | 3/2002 | Tanaka et al. |
| 2005/0151433 A1 | 7/2005 | Isoda et al. |
| 2005/0218732 A1 | 10/2005 | Boyland et al. |
| 2007/0104593 A1 | 5/2007 | Yamaguchi |
| 2008/0226474 A1 | 9/2008 | Yoshida et al. |

(Continued)

OTHER PUBLICATIONS

International Preliminary Report on Patentability; PCT/US2013/073078; dated Jun. 18, 2015; 6 pages.

(Continued)

*Primary Examiner* — Hanh Nguyen
(74) *Attorney, Agent, or Firm* — Bose McKinney & Evans LLP

(57) ABSTRACT

An electric machine including a stator, a rotor surrounded by and rotatable relative to the stator, a supply terminal assembly, and an electronic module electrically connected to the stator. The electronic module includes a terminal having at least one bonding region. An electrical buss is attached to the supply terminal assembly, and includes a first and second conductor portions each having a connection region joined to a bonding region of the terminal of the electronic module. The terminal of the electronic module is electrically connected to the supply terminal assembly by the first and second conductor portions. Also disclosed is a method for manufacturing such an electric machine.

10 Claims, 7 Drawing Sheets

(56) References Cited

U.S. PATENT DOCUMENTS

2010/0308700 A1* 12/2010 Isoda ................... H02K 5/225
                                                        310/68 D
2011/0273042 A1* 11/2011 Isoda .................. H02K 11/046
                                                        310/63
2014/0265671 A1*  9/2014 Bradfield ............... H02K 5/225
                                                        310/71

OTHER PUBLICATIONS

International Search Report and Written Opinion; PCT/US2013/073078; dated Mar. 18, 2014; 9 pages.

\* cited by examiner

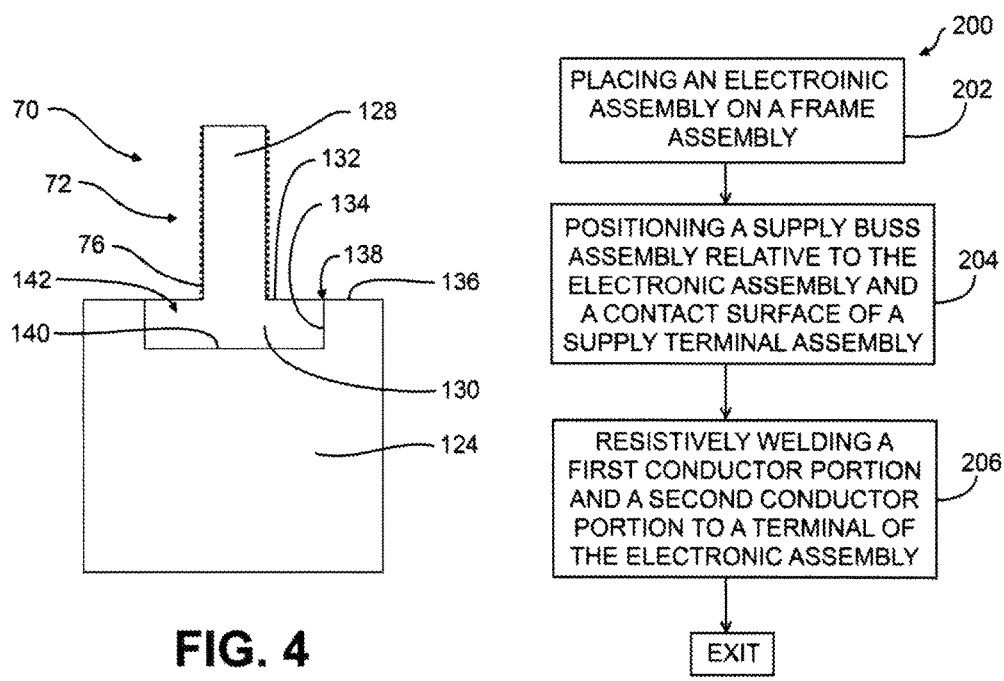
FIG. 4
FIG. 12
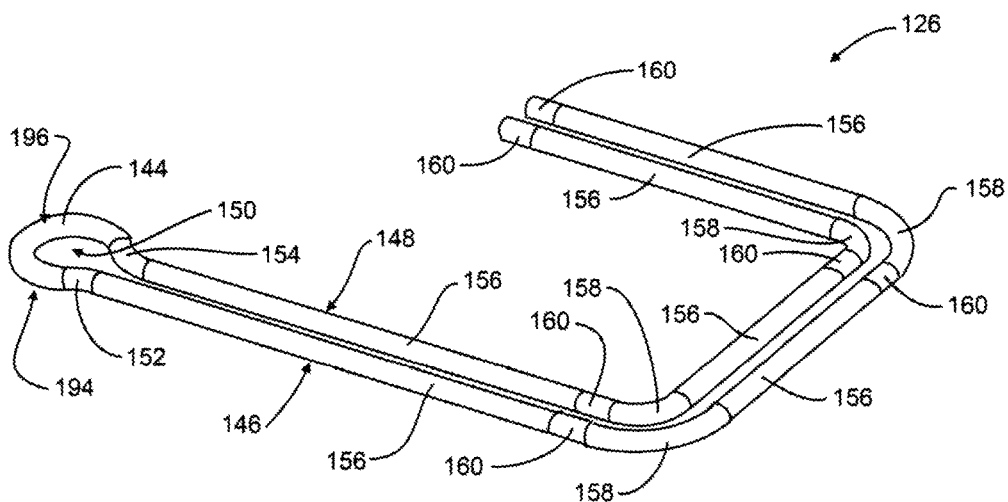
FIG. 5

ELECTRIC MACHINE HAVING ELECTRICAL BUSS AND MANUFACTURING METHOD THEREFOR

CROSS-REFERENCE TO RELATED APPLICATIONS

This application is related to PCT International Patent Application No. PCT/US13/72829 entitled ELECTRIC MACHINE AND ACCESSORY filed on Dec. 3, 2013; and PCT International Patent Application No. PCT/US13/73355 entitled SYSTEM, METHOD, AND CIRCUITRY TO RECTIFY AN ALTERNATING CURRENT SIGNAL WITH MOSFET HALF-BRIDGE CIRCUITRY filed on Dec. 5, 2013; and is a continuation of PCT International Patent Application No. PCT/US13/73078 entitled ELECTRIC MACHINE HAVING ELECTRICAL BUSS AND MANUFACTURING METHOD THEREFOR filed on Dec. 4, 2013, which claims priority to U.S. Provisional Patent Application Ser. No. 61/733,263 entitled SYSTEMS, DEVICES, AND METHODS FOR PROVIDING A POWER SUPPLY BUSS IN AN ELECTRICAL MACHINE filed on Dec. 4, 2012. The entire disclosures of all the above-listed patent applications are incorporated herein by reference.

BACKGROUND

The present disclosure relates to electric machines and electrical busses therefor, and methods for their manufacture.

Electric machines may include a stator, a rotor that rotates relative to the stator, and a housing configured to receive the stator and the rotor. The housing typically positions the stator relative to the rotor to channel magnetic flux between the rotor and the stator, and may include a cover configured to enclose portions of the electric machine. Some electric machines also include a fan that rotates in unison with the rotor, and forms part of a cooling system that removes heat from the stator, which typically includes a stator core and stator windings. Generally, each stator winding corresponds to a phase of an alternating current signal. For example, an electric machine having three independent stator windings may be a three-phase electric machine with the phase of each of the alternating current signals being separated from the other two phases by 120 degrees. Similarly, a six-phase electric machine may have six independent stator windings.

Electric machines may receive and/or generate external torque for their operation. Electric machines that receive external torque generally operate as generators, whereas those that generate external torque generally operate as motors. Still other electric machines selectively operate as either a generator or a motor. Electrical current received by an electric machine operating as a motor induces mechanical torque on the rotor; an electric machine operating as a generator generates an electrical current or voltage as a function of a mechanical torque applied to the rotor. In either case, an alternating current may be directed through the electrical windings of the stator in a manner well-understood by those having ordinary skill in the art.

Converting kinetic energy to electrical energy with a generator, or electrical energy to kinetic energy with a motor, can generate substantial heat due to resistive losses and switching losses. Improvements in the design of electric machines to increase energy efficiency, such as by reducing such losses, are desirable.

SUMMARY

An electric machine according to the present disclosure includes an electrical buss configured to provide both improved functional performance and manufacturability advantages; the electrical buss may, for example, be a power supply buss. The power supply buss herein disclosed provides parallel paths for conducting current between a terminal of an electronic device and a supply terminal of an electric machine. In addition, the power supply buss may be configured to provide surfaces to which electrodes of a resistive welding machine are applied in order to resistively weld a terminal of the electronic device to the power supply buss.

As an example, one embodiment of an electrical buss disclosed herein includes a single conductor configured for being coupled to a supply voltage interface of an electric machine. The single conductor may be formed to include a first conductive portion and a second conductive portion, each configured to contact a terminal of an electronic device. The terminal of the electronic device may be coated or plated with a material conducive to the formation of a welded joint between the terminal and the electrical buss. The first conductive portion and the second conductive portion may be positioned such that they are both maintained in contact with the terminal of the electronic device in the electric machine, with the terminal of the electronic device disposed between the first conductive portion and the second conductive portion.

The first conductive portion and the second conductive portion may be resistively welded to the terminal of the electronic device. For example, the weld heads of a resistive welding machine may contact the single conductor to mechanically hold the first conductive portion and the second conductive portion against opposing surfaces of an electronic device terminal disposed therebetween. The resistive welding machine provides electrical energy to or between the weld heads to induce a current to pass through the single conductor and the terminal of the electronic device, and the current may pass through each conductor portion and any coating or plating on the terminal against which the conductor portion abuts, and the terminal. The heat generated by the current forms a first welded joint between the terminal and the first conductive portion and a second welded joint between the terminal and the second conductive portion. The buss may be formed from a single piece of extruded or drawn wire which may be made of copper or a copper alloy, with the first conductor portion and the second conductor portion each having bare copper regions in contact with the weld heads of the resistive welding machine and the terminal of the electronic device contact. The resistive welding machine applies electrical voltage or current to the bear copper areas to induce a current between a bare copper region of the first conductor portion and a bare copper region of the second conductor portion, with the current also passing through the coating or plating on the terminal and the terminal. The current resistively heats the terminal and the copper material in contact with the terminal to form the first welded joint and the second welded joint.

Some embodiments of an electric machine according to the present disclosure include an electronic module joined to a buss, the electronic module including a terminal having a bonding region. The electrical buss may include a first conductor portion and a second conductor portion and a terminal contact portion formed by the first conductor portion and the second conductor portion. The terminal contact portion is configured to mate with a supply terminal assembly of the electric machine, whereby a both the first and second conductor portions are in electrical communication with the supply terminal assembly. The first conductor portion has a terminal contact area joined to the bonding region of the terminal of the electronic module, and the second conductor portion has a terminal contact area joined to the bonding region of the terminal of the electronic module, whereby the terminal of the electronic module is in electrical communication with the supply terminal assembly through both the first and the second conductor portions of the buss. In some embodiments, the terminal contact area of the first conductor portion and the terminal contact area of the second conductor portion are located in connection regions thereof and are resistively welded to the bonding region of the terminal of the electronic module. In some embodiments, the connection regions of the first and second conductor portions are substantially parallel to each other. The cross-sectional shape of the first conductor portion and the second conductor portion may be substantially circular, but in some alternative embodiments may be substantially rectangular (as used herein, rectangular includes square). In some embodiments, the terminal contact area of the first conductor portion may include a stamped surface area that forms the bonding region of the first conductor portion. Similarly, the terminal contact area of the second conductor portion may also include a stamped surface area that forms the bonding region of the second conductor portion.

An embodiment of a method for manufacturing an electric machine according to the present disclosure includes a process for attaching the buss with an electronic module. The process may include providing an electronic module with a terminal having a bonding region, and providing a buss including a first conductor portion having a connection region and a second conductor portion having a connection region. The buss is positioned relative to the electronic module such that the bonding region of the terminal is proximate to the connection region of the first conductor portion and the connection region of the second conductor portion. Electrical energy is then applied to the first conductor portion and the second conductor portion to resistively weld the connection region of the first conductor portion and the connection region of the second conductor portion to the bonding region of the terminal. The connection regions of the first and second conductor portions may each include a bonding surface area. To form the joints, a mechanical force may be applied to the first conductor portion and the second conductor portion to place the bonding surface area of the first conductor portion and the bonding surface area of the second conductor portion in contact with the bonding region of the terminal. To facilitate resistive welding of the joints, the connection regions of the first and second conductor portions may each include a weld head contact area. Electrical energy is applied to the first conductor portion and the second conductor portion through first and second weld heads of a welding machine respectively placed in contact with the weld head contact areas of the first and second conductor portions.

In some embodiments of the method for manufacturing an electric machine according to the present disclosure, the buss is positioned to dispose the terminal of the electronic module between the first conductor portion and the second conductor portion. In addition, a mechanical force may be applied by pinching the terminal of the electronic module between the bonding surface area of the first conductor portion and the bonding surface area of the second conductor portion using the first weld head and the second weld head of the welding machine.

The present disclosure provides an electric machine including a stator, a rotor surrounded by and rotatable relative to the stator, a supply terminal assembly, and an electronic module electrically connected to the stator. The electronic module includes a terminal having at least one bonding region. An electrical buss is attached to the supply terminal assembly, and includes a first and second conductor portions each having a connection region joined to a bonding region of the terminal of the electronic module. The terminal of the electronic module is electrically connected to the supply terminal assembly by the first and second conductor portions.

A further aspect of the electric machine is that the connection region of the first conductor portion and the connection region of the second conductor portion are respectively affixed to a bonding region of the terminal of the electronic module.

A further aspect of the electric machine is that the buss also includes a terminal contact portion disposed between the first conductor portion and the second conductor portion, with the terminal contact portion attached to the supply terminal assembly.

Another aspect of the electric machine is that the terminal contact portion is configured to at least partially surround a supply voltage post of the supply terminal assembly.

A further aspect of the electric machine is that the connection region of the first conductor portion is substantially parallel to the connection region of the second conductor portion.

A further aspect of the electric machine is that the terminal of the electronic module is disposed between the connection region of the first conductor portion and the connection region of the second conductor portion.

Another aspect of the electric machine is that the connection region of the first conductor portion includes a flattened contact region and the connection region of the second conductor portion includes a flattened contact region, each flattened contact region adapted to respectively abut a bonding region of the terminal of the electronic module with surface-to-surface contact.

A further aspect of the electric machine is that the first conductor portion and the second conductor portion each have a conductor section having a first cross-sectional shape and the connection regions of the first conductor portion and the second conductor portion have respective cross-sectional shapes that differ substantially from the first cross-sectional shape.

Another aspect of the electric machine is that the first cross-sectional shape is substantially circular and the cross-sectional shapes of the connection regions each have a substantially flat portion adapted to respectively abut a bonding region of the terminal of the electronic module with surface-to-surface contact.

A further aspect of the electric machine is that the first and second conductor portions are formed from a unitary elongate metallic conductor.

The present disclosure also provides a method for manufacturing an electric machine having a rotor surrounded by and rotatable relative to a stator, including: providing an electronic module intended for connection to the stator and including a terminal having at least one bonding region; providing a buss including a first conductor portion having a connection region and a second conductor portion having a connection region; positioning the buss relative to the electronic module such that a bonding region of the terminal is proximate to the connection region of the first conductor portion and the connection region of the second conductor portion; and applying electrical energy to the connection region of the first conductor portion and the connection region of the second conductor portion to resistively weld each of the connection region of the first conductor portion and the connection region of the second conductor portion to a bonding region of the terminal.

A further aspect of the method is that the connection regions of the first and second conductor portions each include a bonding surface area, and the method further includes applying mechanical forces to the first conductor portion and the second conductor portion to place each of the bonding surface area of the first conductor portion and the bonding surface area of the second conductor portion in contact with a bonding region of the terminal.

Another aspect of the method is that the connection regions of the first and second conductor portions each a weld head contact area, and applying electrical energy to the connection region of the first conductor portion and the connection region of the second conductor portion also includes: placing a first weld head of a welding machine in contact with the weld head contact area of the first conductor portion; placing a second weld head of the welding machine in contact with the weld head contact area of the second conductor portion; and conducting electrical energy between the first and second weld heads.

A further aspect of the method is that it also includes pinching the terminal of the electronic module between the first conductor portion and the second conductor portion by applying a first weld head of a resistive welding machine to the connection region of the first conductor portion and applying a second weld head of the resistive welding machine to the connection region of the second conductor portion.

A further aspect of the method is that positioning the buss relative to the electronic module such that a bonding region of the terminal is proximate to the connection region of the first conductor portion and the connection region of the second conductor portion includes positioning the buss such that the terminal of the electronic module is disposed between the first conductor portion and the second conductor portion.

Another aspect of the method is that it also includes pinching the terminal of the electronic module between the connection region of the first conductor portion and the connection region of the second conductor portion with a first weld head and a second weld head.

A further aspect of the method is that providing a buss including a first conductor portion having a connection region and a second conductor portion having a connection region includes forming a unitary elongate metallic conductor to provide spaced, substantially parallel connection regions of the first conductor portion and the second conductor portion prior to positioning the buss relative to the electronic module.

A further aspect of the method is that providing a buss including a first conductor portion having a connection region and a second conductor portion having a connection region includes forming a unitary elongate metallic conductor to integrally provide a terminal contact portion disposed between the first conductor portion and the second conductor portion prior to positioning the buss relative to the electronic module.

Another aspect of the method is that it also includes forming the conductor to provide a terminal contact portion having a substantially circular shape.

A further aspect of the method is that providing a buss including a first conductor portion having a connection region and a second conductor portion having a connection region includes plastically deforming a unitary elongate metallic conductor to provide flattened contact regions of the connection regions of the first and second conductor portions.

BRIEF DESCRIPTION OF THE DRAWINGS

The above-mentioned aspects and other characteristics and advantages of an apparatus and/or method according to the present disclosure will become more apparent and will be better understood by reference to the following description of exemplary embodiments taken in conjunction with the accompanying drawings, wherein:

FIG. 4 depicts a cross-sectional view of a portion of the supply terminal assembly depicted in FIG. 3;

FIG. 5 depicts an isometric view of the supply buss fabricated with a metallic wire;

FIG. 12 depicts an operation to connect the supply buss with an electronic assembly.

Figure 1:
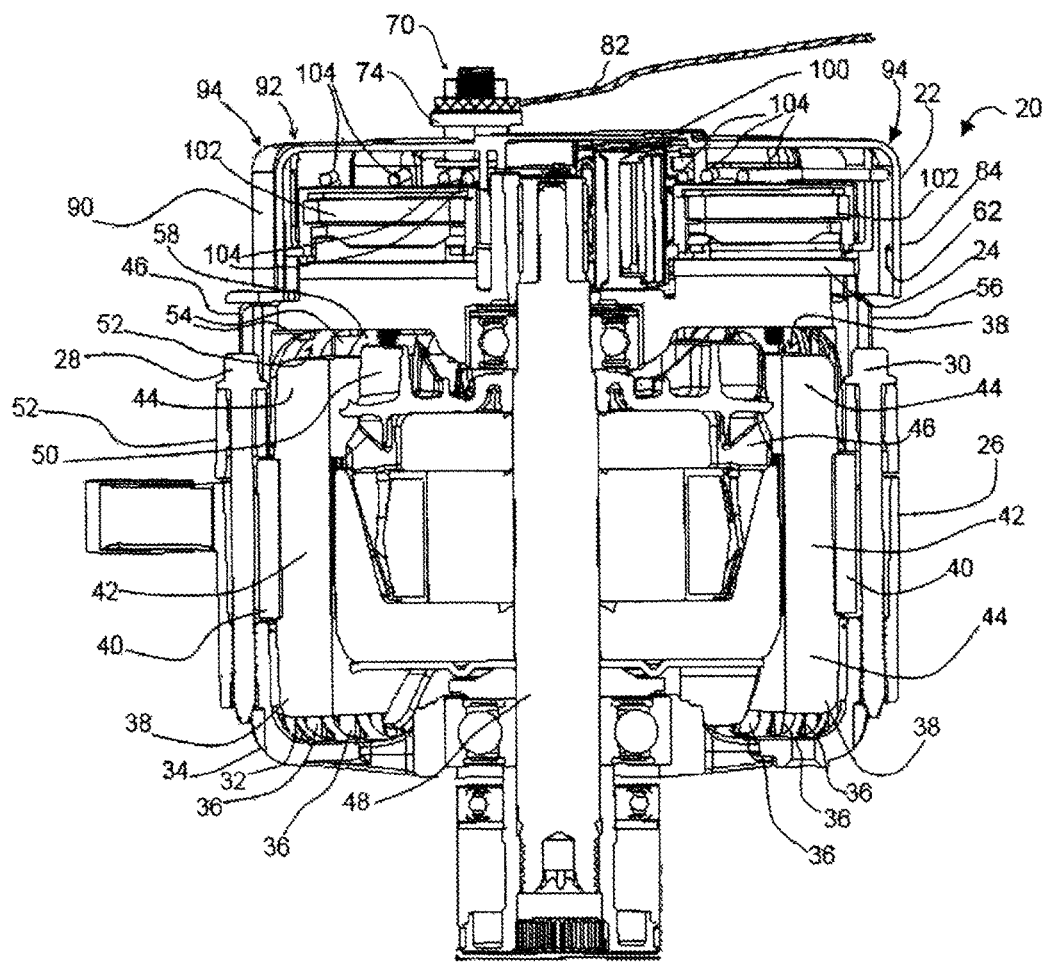
FIG. 1 depicts a cross-sectional view of an electric machine in the form of an alternator-type generator, wherein the electrical buss is a supply buss.

Corresponding reference characters indicate corresponding parts throughout the several views. Although the drawings represent embodiments of the disclosed apparatus and method, the drawings are not necessarily to scale or to the same scale and certain features may be exaggerated or omitted in order to better illustrate and explain the present disclosure. Moreover, in accompanying drawings that show sectional views, cross-hatching of various sectional elements may have been omitted for clarity. It is to be understood that this omission of cross-hatching is for the purpose of clarity in illustration only.

DETAILED DESCRIPTION OF EXEMPLARY EMBODIMENT(S)

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Embodiments disclosed in the detailed description relate to systems, devices, and methods for providing an electrical buss in an electric machine exemplified by an alternator including a power supply buss configured to provide both improved functional performance and manufacturability advantages vis-à-vis prior electrical machines and electrical busses. The exemplary power supply buss may provide a parallel path for conducting current between a terminal of an electronic device and a supply terminal of the electric machine. In addition, the buss may be configured to provide surfaces to which weld heads or electrodes of a resistive welding machine can be applied to resistively weld a terminal of the electronic device to the buss.

As an example, embodiments of an electrical buss disclosed herein may include a single conductor that is preformed or shaped to couple to the supply terminal of an alternator. The single conductor may be further pre-formed to include a first conductive portion and a second conductive portion configured to contact a terminal of an electronic device. The single conductor may be bent to form a terminal contact portion from which the first conductive portion and the second conductive portion both extend. The first conductive portion and the second conductive portion may be resistively welded to a terminal of an electronic device, which may be coated or plated with a material conducive to formation of a welded joint. To weld the single conductor to the terminal of the electronic device, the first conductive portion and the second conductive portion may be held in contact with the terminal of the electronic device while electrical energy is applied by the weld heads to each of the first conductive portion and the second conductive portion. In some cases, the single conductor may be formed from an elongate piece of an electrically conducive metallic material such as copper or a copper alloy. The single conductor may be an extruded or drawn wire or stamped sheet material. The single conductor material may be substantially circular or, alternatively, substantially rectangular or hexagonal in cross-section.

FIG. 1 depicts a cross-sectional view of an exemplary embodiment of an electric machine 20 that is an alternator. Other, alternative embodiments of the electric machine 20 may be configured as electric motors, or as motor/generator apparatuses controlled to operate in an alternator mode of operation or an electric motor mode of operation. As shown, the electric machine 20 includes a cover 22, a frame assembly 24, and a stator housing 26. The cover 22 is configured to mate with the frame assembly 24, which is attached to the stator housing 26 with a first fastener 28 and a second fastener 30. The stator housing 26 has an interior stator housing surface 32 and an exterior stator housing surface 34 which may join to form edges defining stator housing ventilation apertures 36.

The electric machine 20 includes a stator 38 having a stator core 40 and stator windings 42 having end turns 44 that extend beyond the stator core 40. The electric machine 20 also includes a rotor 46 that is fixed to a shaft 48 for rotation therewith, and a fan 50 located between the frame assembly 24 and the rotor and rotatable in unison with the rotor and the shaft. The fan 50 may be configured as a centrifugal fan.

Figure 2:
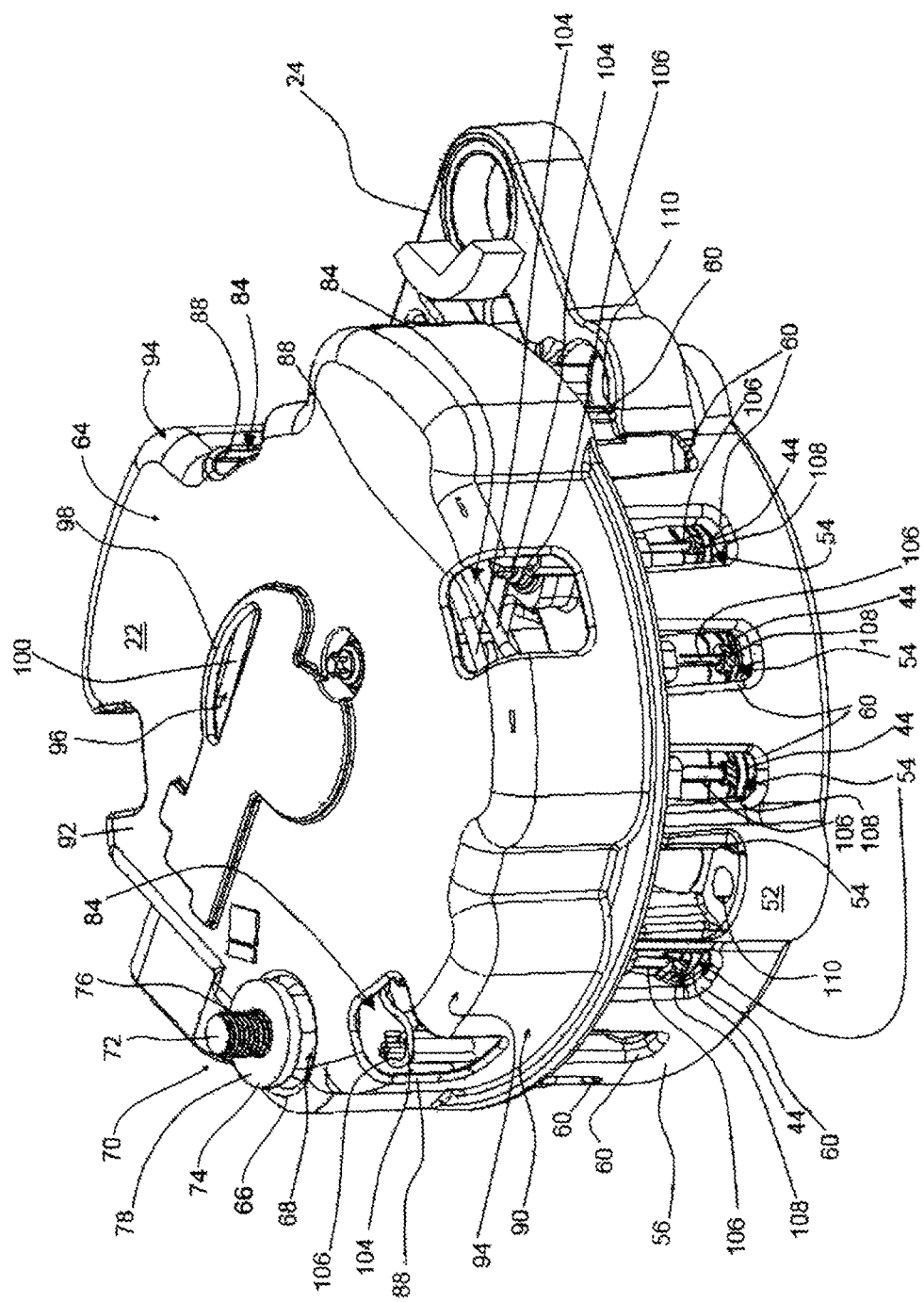
FIG. 2 depicts an isometric view of a frame assembly and a cover of the electric machine depicted in FIG. 1.
Figure 3:
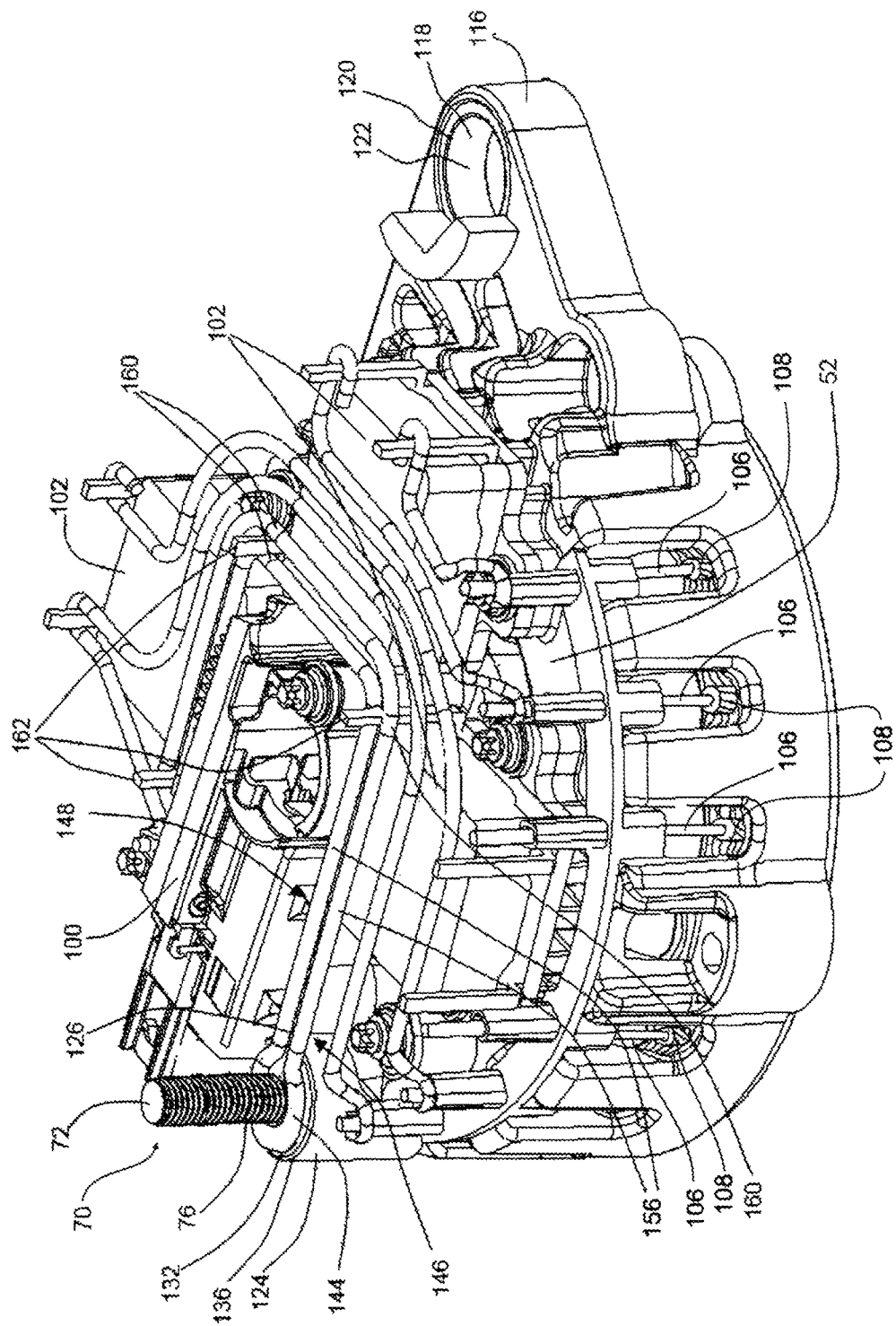
FIG. 3 depicts an isometric view of a frame assembly of the electric machine depicted in FIGS. 1 and 2.

Referring to FIGS. 2 and 3, the frame assembly 24 includes a rigid frame 52 formed from a metallic material such as a casting of aluminum or an aluminum alloy. The frame 52 has an exterior frame surface 56 and an interior frame surface 58 which join to form the edges 60 of frame ventilation apertures 54. The frame ventilation apertures 54 may provide passages through which cooling air may be exhausted by the fan 50 from the interior region of the electric machine 20.

The cover 22 has an interior cover surface 62 and an exterior cover surface 64 which join to form the peripheral edge 66 of a supply terminal opening 68. The machine 20 includes a supply terminal assembly 70 having a supply voltage post 72 which extends through the supply terminal opening 68. The supply voltage post 72 is formed from a rigid, electrically conductive material such as steel. As shown, the supply voltage post 72 is configured to threadedly receive and have electrical contact with an annular fastener 74 formed from a rigid, suitably conductive material. The annular fastener 74 is disk-shaped and has opposite, substantially flat surfaces 78. Referring to FIG. 1, the upwardly facing flat surface 78 provides an electrical contact surface for an electrical cable 82 that is secured to the supply terminal assembly 70 with a nut. The fastener 74 is configured to provide surface-to-surface contact with the cable to increase the area through which they are in electrical communication, relative to mere line-to-line contact, which decreases impedance between the supply terminal assembly 70 and the cable.

When the electric machine 20 is configured as a generator or an alternator, the electric machine 20 produces a supply voltage on the supply voltage post 72. In such case, electric machine 20 converts mechanical torque applied to the rotor 46 to supply voltage at the supply terminal assembly 70. The supply voltage may be distributed to various devices via the electrical cable 82 coupled to the supply voltage post 72. Alternatively, some embodiments of the electric machine 20 may be configured to operate as an electrical motor. In such case, a supply voltage is provided via the electrical cable 82 to the supply voltage post 72, and is subsequently directed to the stator windings, which magnetically induces a mechanical torque on the rotor and its shaft.

Interior cover surface 62 and an exterior cover surface 64 also join to form side vent edges 88 of cover ventilation apertures 84. Cover 22 also has a side cover portion 90 and a top cover portion 92, with the top cover portion 92 having a somewhat symmetrical form about central region of the electric machine 20, and the side cover portion 90 forming an irregular cylindrical shape that intersects with the top cover portion 92 to form a rounded or curved shoulder portion 94 of the cover. In some embodiments, the side vent edges 88 of the cover ventilation apertures 84 traverse the curved shoulder portion 94 as shown, whereby a portion of each cover ventilation aperture 84 is substantially located in both the side cover portion 90 and the top cover portion 92. The top cover portion 92 may include a top ventilation aperture 96 defined by a top vent edge 98. The locations and shapes of the cover ventilation apertures 84 and the top ventilation aperture 96 are configured to direct a flow of cooling air over various portions of the electric machine 20. As an example, some embodiments of the cover 22 may position the top ventilation aperture 96 over or near a regulator 100 configured to monitor the supply voltage present on the supply voltage post and adjust the operation of the electric machine 20 as a function of the supply voltage. In the case where the electric machine operates as an alternator, the regulator 100 controls the magnetic flux generated by the rotor 46 to regulate a magnitude of the supply voltage. During operation, the regulator 100 is cooled by a flow of air drawn though the top ventilation aperture 96, the draft induced by the fan 50 generating a low air pressure inside the cover 22 as it expels cooling air from the machine through the frame ventilation apertures 54.

Some embodiments of the machine 20 have the cover ventilation apertures 84 located substantially proximate to electronic assemblies 102, which in an alternator are electronic modules configured rectify an alternating current signal they receive from the stator windings 42 and convert to a direct current supply voltage provided to the supply voltage post 72. In other embodiments (e.g., a DC motor), the electronic assemblies 102 may be electronic modules configured convert a direct current supply voltage from the supply voltage post 72 to an alternating current signal directed through the stator windings 42 to drive the rotor 46. The cover ventilation apertures 84 may be shaped to direct a flow of cooling air about the electronic assemblies 102, and/or positioned to direct a flow of air over a portion of the electrical conductors 104.

During operation, the rotation of the rotor 46 and the shaft 48 causes the fan 50 to circulate cooling air through the frame assembly 24 and generate an air flow into the interior regions of the electric machine 20 through cover ventilation apertures 84 and the top ventilation aperture 96, and expel the warmed air from the machine through the frame ventilation apertures 54. A first portion of cooling airflow may enter the machine through cover ventilation apertures 84, while a second portion of cooling airflow enters the machine through top ventilation aperture 96. The first and second portions of cooling airflow may intermix within the machine and be expelled from the machine together through the frame ventilation apertures 54. The airflows drawn through the cover ventilation apertures 84 and the top ventilation aperture 96 cool the regulator 100, the electronic assemblies 102, the electrical conductors 104, and portions of the stator windings 42 before being exhausted through the frame ventilation apertures 54. The relative size and location of each of the cover ventilation apertures 84 and the top ventilation aperture 96 may be adjusted to control a flow of air. For example, a target volume of air flow through the cover ventilation apertures 84 may be directed based on the location of a respective one of the cover ventilation apertures 84 relative to an associated one of the electronic assemblies 102. In addition, a direction of the air flow may be adjusted based on a shape of the periphery of each of the cover ventilation apertures 84. The shape and surface area of the periphery of the top ventilation aperture 96 may also be configured to control the volume and direction of the air flow through the top ventilation aperture 96, and the relative volume of air flow through the top ventilation aperture 96 may be adjusted to increase or decrease the volume of air flow through each of the cover ventilation apertures 84.

Referring to FIG. 2, some of the frame ventilation apertures 54 may be configured to provide frame fastener passages 110 that receive fasteners similar to the first and second fasteners 28, 30 depicted in FIG. 1, by which the frame 52 and the stator core 40 may be secured together. The frame 52 may also include mounting lugs 116 (one of which is shown in the Figures). Referring to FIG. 3, each mounting lug 116 has a through hole 118 which may be configured to receive a bolt (not shown) for securing the machine 20 to mounting bracketry (not shown). The mounting bracketry, which may be attached to a vehicle engine if the machine 20 is an alternator, abuts the mounting surfaces 120 of the lugs 116 located about the through holes 118. In some embodiments, the interior surface 122 of one or more through holes 118 is tapped to threadedly engage a bolt received therein for securing the machine 20 to its bracketry.

The supply terminal assembly 70 includes a stand 124 configured to affix the supply voltage post 72. The stand 124 holds the supply voltage post 72 in relationship to an electrical buss 126. FIG. 4 depicts a cross-sectional view of the supply terminal assembly 70 without the fastener 74. The supply voltage post 72 may include a shaft portion 128 that includes threads 76, and an anchor end 130, providing the voltage post with a configuration somewhat like a bolt having a large head. The anchor end 130 has a substantially flat contact surface 132 that provides a substantially planar configured to have low impedance electrical contact with the terminal contact portion 144 of the buss 126.

In some embodiments of the supply terminal assembly 70, the anchor end 130 may be integrated into the stand 124. As an example, the supply terminal assembly 70 may include a stand 124 made of an electrically non-conductive material. For example, the stand 124 may be made of a nylon or glass-filled nylon material, and formed by an injection molding process. Advantageously, in the case where the stand 124 is formed with an electrically non-conductive material, the supply voltage post 72 may be inherently electrically isolated from the frame 52 due to the stand 124 being formed from an electrically non-conductive material, thus avoiding the need for an electrical insulator between the anchor end 130 and the stand 124 or the frame 52 and the stand 124, which would otherwise be provided.

As shown in FIG. 4, the stand 124 is formed with a vertical interior side wall 134 that intersects with a flat, horizontal top surface 136 to form an edge 138 that surrounds the supply voltage post 72. The interior side wall 134 extends from the horizontal top surface 136 into the stand 124 and intersects a horizontal surface 140 to form a mounting cavity 142 configured to receive the anchor end 130 of the supply voltage post 72. In some embodiments, the stand 124 may be formed around and partially encapsulate the anchor end 130 to secure the supply voltage post 72 into the supply terminal assembly 70. Alternatively, in other embodiments, the anchor end 130 may be adhesively attached to the interior side wall 134 and horizontal surface 140 of the mounting cavity 142. For example, an epoxy may be applied to the interior side wall 134 and horizontal surface 140, the supply voltage post 72 then inserted into the cavity 142, and the epoxy then cure to adhere the supply voltage post 72 to the stand. In such embodiments, a two part epoxy may be used to adhesively attach the supply voltage post 72 to the stand 124. Regardless of how the anchor end 132 is affixed to the stand 124, it is preferable that the flat contact surface 132 of the anchor end remain exposed for electrical contact with the terminal contact portion 144 of the buss 126.

The buss 126 is formed from an electrically conductive material such as, for example, copper or a copper alloy. In some embodiments, the supply buss 126 is formed from a single section of wire. The section of wire single wire may be pre-formed or bent into a desired shape to connect the supply voltage post 72 to the electronic assemblies 102. Alternatively, the supply buss 126 may be formed by a single strip of metallic sheet material.

Referring to FIG. 3, the machine 20 includes three separate electronic assemblies 102 affixed to the frame assembly 24. Each of the electronic assemblies 102 has a terminal 162 configured to either receive a supply voltage from the supply terminal assembly 70 (as in the case of a motor) or provide a supply voltage to the supply terminal assembly 70 (as in the present case of an alternator). The supply buss 126 may be formed to provide a connection between each of the electronic assemblies 102 and the supply voltage post 72. Although not depicted, in some alternative embodiments the supply buss 126 may be configured to also connect the supply voltage post 72 to the regulator 100.

FIG. 5 depicts an isometric view of the supply buss 126 formed as a unitary piece from round copper wire of uniform cross-section. The supply buss 126 includes a terminal contact portion 144, a first conductor portion 146, and a second conductor portion 148 that are integrally pre-formed prior to mating the buss 126 with the electronic assemblies 102. The terminal contact portion 144 is configured to interface with the supply terminal assembly 70. As shown, the terminal contact portion 144 includes a curved portion 150 configured to surroundingly receive the shaft portion 128 of the supply voltage post 72. The curved portion 150 is formed into a substantially circular open ring having an interior diameter that is equal to or slightly larger than the major diameter of the threads 76 of the supply voltage post 72. The terminal contact portion 144 has a first elbow curved section 152 and a second elbow curved section 154 which respectively join the first and second conductor portions 146, 148 to the curved portion 150. In some embodiments, the first elbow curved section 152 and the second elbow curved section 154 are mirror imaged bow-shape configured to align the first conductor portion 146 and the second conductor portion 148 in a substantially parallel arrangement. The first conductor portion 146 and the second conductor portion 148 are each be divided into straight conductor sections 156 along the length of the buss 126, the conductor sections 156 of each conductor portion 146, 148 interconnected by curved sections 158 that configure the supply buss 126 to be routed with its first and second conductor portions parallel to each other, and connect to the each of the electronic assemblies 102. Like ordinary wires or metallic strips, the conductor material is pliable yet semi-rigid; plastic deformation of the wire conductor during configuration of the first and second conductor portions 146, 148 results in the buss 126 retaining the shape into which it is bent. Thus, the general configuration of the buss 126 remains substantially unchanged once configured. The cross-section of the conductor portions 146, 148 may be plastically deformed at certain locations therealong during configuration of the buss 126, as discussed further below. For example, FIG. 5 depicts a pre-formed shape of the supply buss 126 ready for mating with the electronic assemblies 102, as depicted in FIG. 3. After assembly, the terminal contact portion 144 may be held in contact with the mounting surface 120 by the fastener 74 (not shown).

Figure 6:
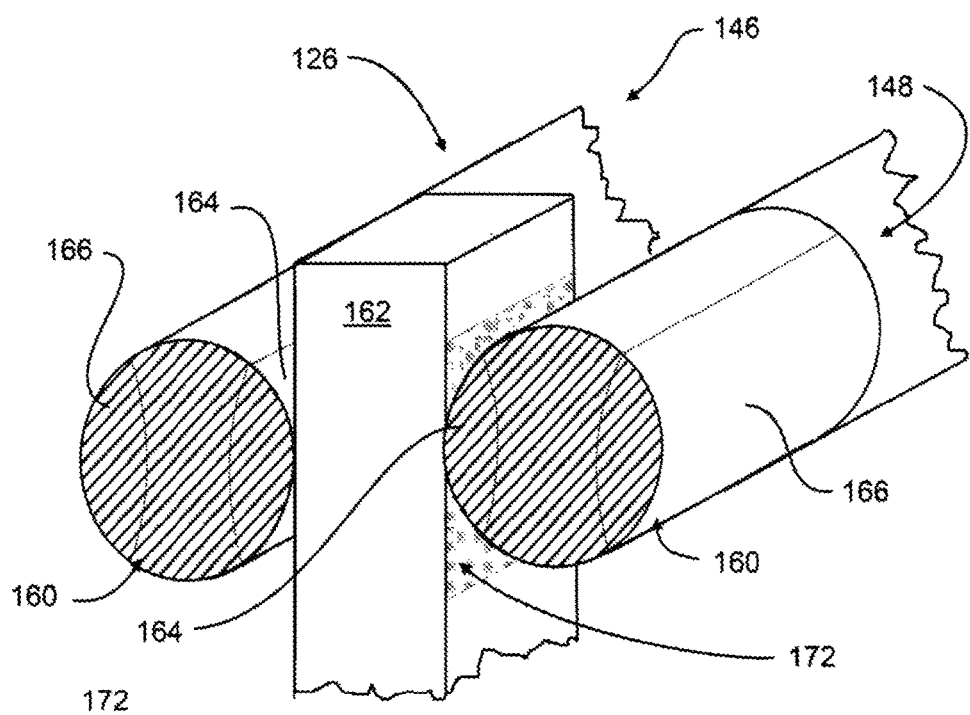
FIG. 6 depicts an isometric view of a portion of the supply buss in relationship with a terminal of an electronic assembly.
Figure 7:
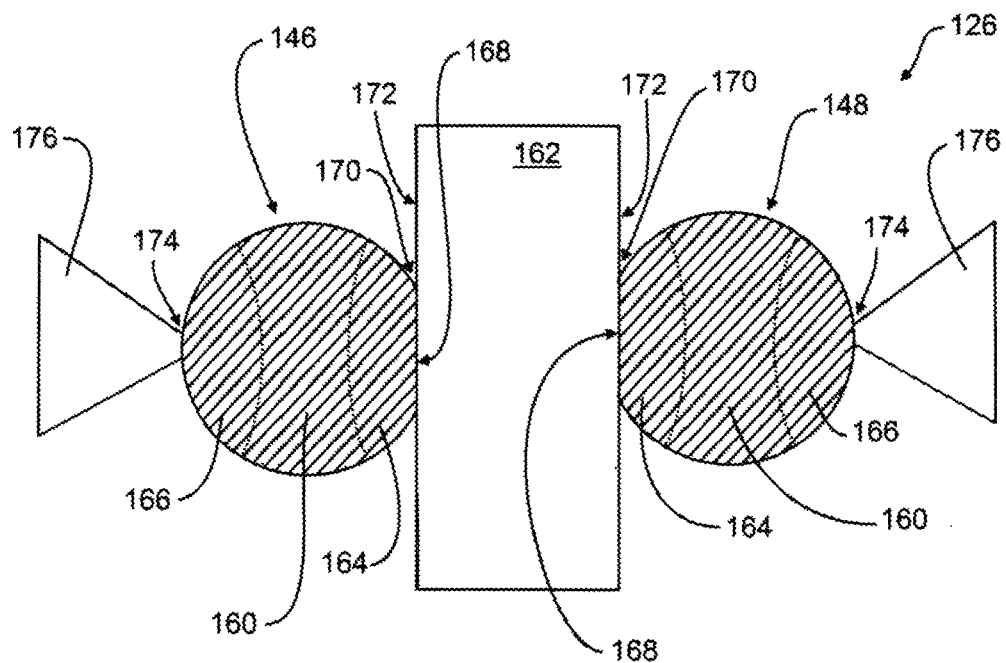
FIG. 7 depicts a cross-sectional view of the relationship between the supply buss and a terminal of an electronic assembly.
Figure 8:
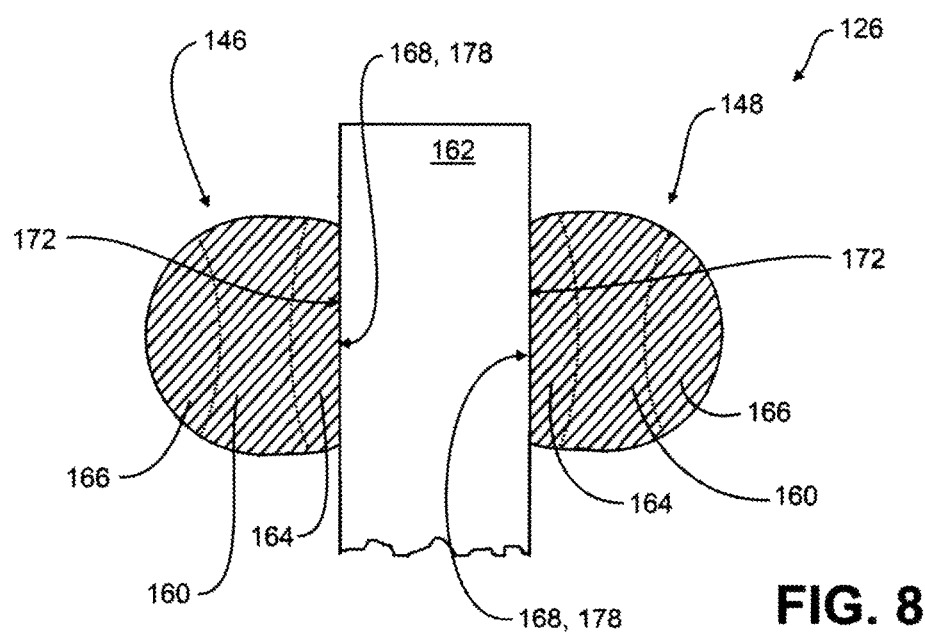
FIG. 8 depicts a cross-sectional view of a terminal contact area of the supply buss.
Figure 9:
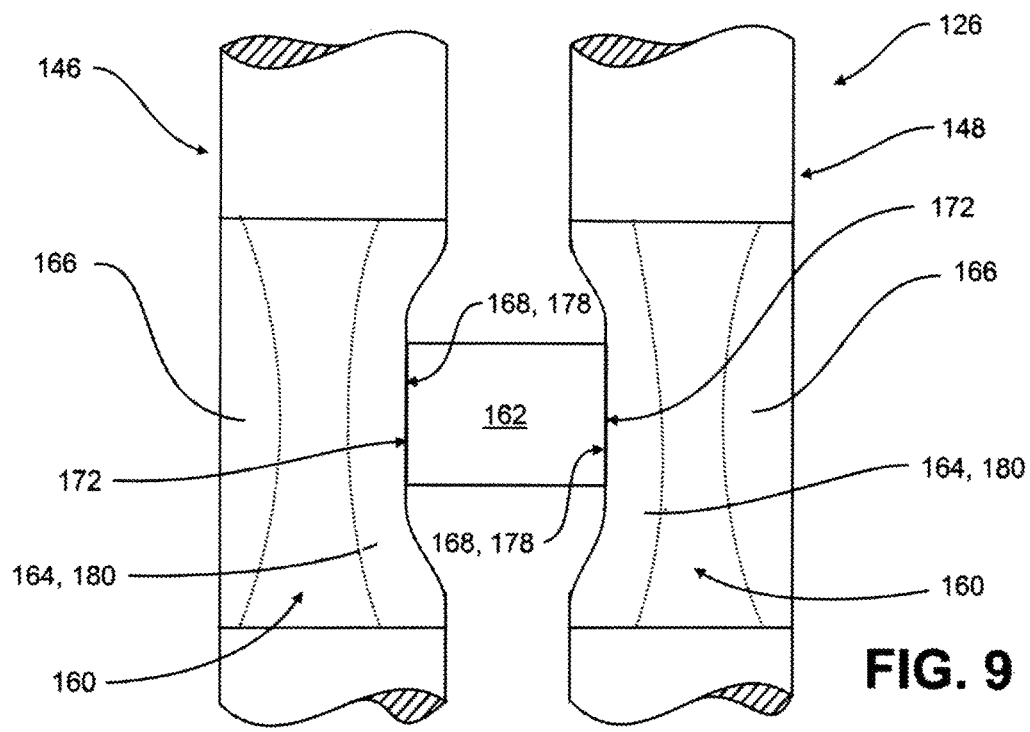
FIG. 9 depicts a top view of the terminal contact area having the flattened contact region.
Figure 10:
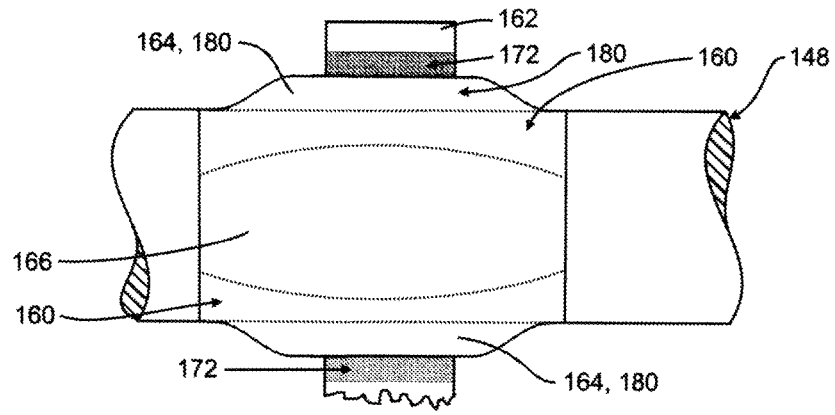
FIG. 10 depicts a profile view of the terminal contact area having the flattened contact region.

Each of the conductor sections 156 has a connection region 160. The connection region 160 may include a terminal contact area 164 and a weld head contact area 166. The terminal contact area 164 may be configured to provide bonding surface area 168 conducive to creating an electrical connection 170 between the terminal 162 and the supply buss 126. FIGS. 6 and 7 depict views of the relationship between the supply buss 126 and a terminal 162 of one of the electronic assemblies 102. Each terminal 162 may be plated with a coating that is conducive to joining the terminal 162 and the supply buss 126. For example, in some embodiments, the terminal 162 may be plated with tin or a similar material to improve formation of a solder joint between the terminal 162 and the supply buss 126. Alternatively, in some embodiments, the terminal 162 may be plated with a nickel phosphorous material to promote formation of a resistive welding joint between the terminal 162 and the supply buss 126. The terminal 162 includes at least one bonding region 172 shown shaded in the Figures. Each bonding region 172 is a target region at which the bond is achieved between the terminal contact area 164 of a connection region 160 and the terminal 162. As shown, the terminal 162 is substantially rectangular in cross section and has two bonding regions 172, one located on each of two opposite sides of the terminal 162. In some embodiments, a single bonding region 172 may provided on one side of the terminal 162, with the connection regions 160 of the first and second conductor portions 146, 148 both affixed thereto. Each connection region 160 may have a weld head contact area 166 generally opposite the terminal contact area 164, providing a contact point 174 on the connection region 160 for a weld head 176 of a resistive welding machine as shown in FIG. 7. The cross-sectional shape of the connection region 160 and/or the bonding region 172 may be locally deformed during the resistive welding process as a result of material melting due to heat generated by the resistive welding and mechanical force applied by the electrodes 176. This deformation is not necessarily undesirable, for it may increase the bonding surface area 168 of the contact area 164 thus enlarging the electrical contact area between the conductor portions 146, 148 and the terminal 162, as can be understood with reference to FIG. 7. Indeed, as depicted in FIGS. 8-10, some embodiments of the terminal contact area 164 may be stamped or coined to intentionally increase the bonding surface area 168 thereof by providing the terminal contact area 164 with a flattened contact region 178 which provides increased, surface-to-surface contact between the terminal contact area 164 and the bonding region 172 of the terminal 162. Thus, the first and second conductor portions may include conductor sections 156 of a substantially circular cross-sectional shape, and connection regions 160 of substantially different cross-sectional shape notably including substantially flat portion defined by the flattened contact region 178, which is adapted to the bonding region 172 of the terminal 162 of the electronic module (102) with surface-to-surface contact. As depicted in FIGS. 9 and 10, each terminal contact area 164 may include a coined deformation region 180 that contributes to an increase in the flat, surface-to-surface contact area provided by the flattened contact region 178. In some embodiments of the buss 126 the weld head contact areas 166 may also be stamped or coined to provide a substantially flat surface. In some embodiments, the supply buss 126 may be formed by first bending or deforming the conductor material to its general configuration, as depicted in FIG. 5, and thereafter pinching the terminal contact area 164 to plastically deform the connection regions 160 form the flattened contact regions 178. Alternatively, the conductor material may be first stamped or coined to form the flattened contact region 178, after which the conductor material is plastically deformed to the desired general shape of the buss 126.

Some alternative embodiments of the electrical buss 126 may further include a terminal contact portion 144 that is stamped or coined to maximize the surface area of the terminal contact portion 144 in contact with the contact surface 132 of the supply terminal assembly 70. The stamped or coined portion of the terminal contact portion 144 may have a bottom surface region 194 that is substantially flattened and oriented to be in surface-to-surface contact with the substantially flat contact surface 132. In addition, the stamped or coined portion of the terminal contact portion 144 may have a top surface region 196 that is substantially flattened and oriented to be in surface-to-surface contact with the interfacing, substantially flat surface of the fastener 74.

Figure 11:
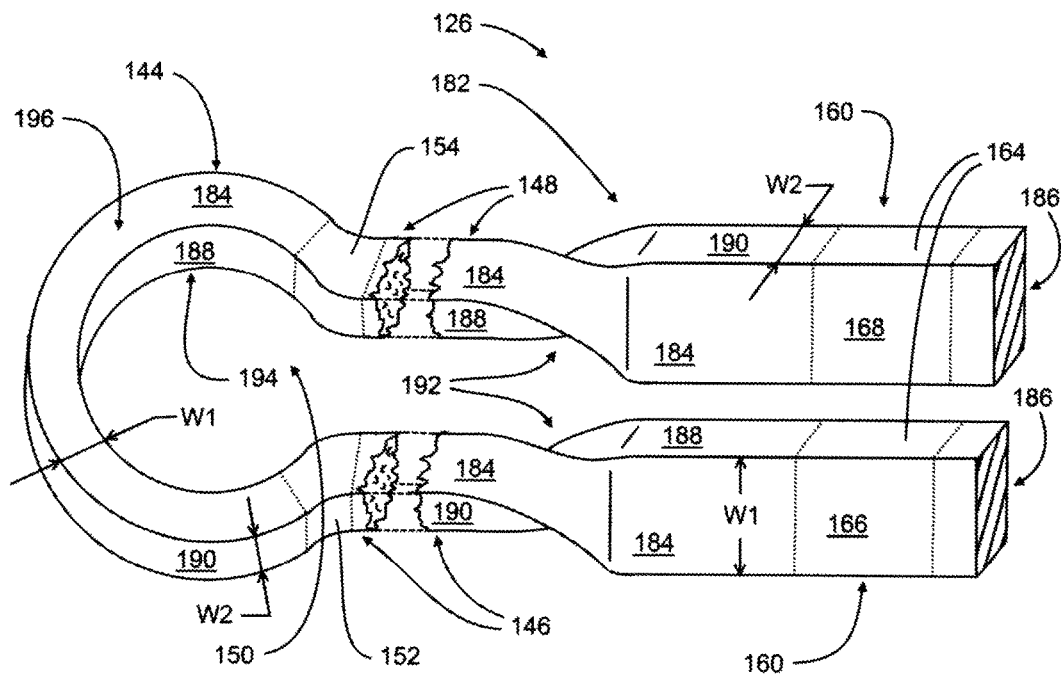
FIG. 11 depicts an isometric view of another embodiment of the supply buss formed from a metallic strip having a substantially rectangular cross-section.

FIG. 11 depicts an embodiment of the supply buss 126 having a conductor formed from a metallic strip or wire 182 having a substantially rectangular cross-section. The cross-section of the metallic strip 182 may be substantially uniform in shape. The metallic strip 182 has a first surface 184 and an opposing second surface 186 of a first width W1, and a third surface 188 and an opposing fourth surface 190 of a second width W2, which may be less than the first width W1. The first and second widths W1, W2 may differ to the extent that the first and second surfaces 184, 186 (of width W1) may be considered faces, and the third and fourth surfaces 188, 190 (of width W2) considered edges. Between the terminal contact portion 144 and the connection regions 160 adjacent thereto, the first conductor portion 146 and the second conductor portion 148 each include a twist region 192 that rotates each conductor portion about 90 degrees about its respective longitudinal axis. The twist region 192 orients the first surface/face 184 and the second surface/face 186 of each conductor portion 146, 148 such that they provide the weld head contact area 166 and/or the bonding surface area 168 of the connection regions 160. In addition, the twist region 192 orients the first surface/face 184 and the second surface/face 186 to maximize the surface area of the terminal contact portion 144 in contact with the respective one of the interfacing flat surface 78 of the fastener 74 and the contact surface 132 of the supply terminal assembly 70.

In some embodiments of a method for manufacturing the electrical buss 126, and thus for manufacturing the machine 20, a conductor is formed from a contiguous section of copper wire fed through a stamping machine (not shown) that deforms connection regions 160 to form flattened contact regions 178. In some cases, the stamping machine may also substantially flatten each weld head contact area 166. The conductor may then be bent to form the terminal contact portion 144. If wire of rectangular cross-section is used, the conductor may be twisted to form each twist region 192. In some embodiments, the terminal contact portion 144 may be stamped or coined, and the conductor may then bent to form the curved sections 158, achieving the desired configuration of buss 126.

FIG. 12 depicts a flow chart of an exemplary process 200 that may be used in the manufacturing of a electric machine 20, particularly in operations related to connecting the electrical buss 126 and the electronic assemblies 102. In some embodiments, the electronic assemblies 102 are placed on the frame 52 of the frame assembly 24 in Step 202. For example, a robotic machine may place the electronic assemblies 102 on the frame 52.

In Step 204, the supply buss 126 may be positioned relative to the electronic assemblies 102 and the contact surface 132 of the supply terminal assembly 70. For example, the supply buss 126 may be pre-formed from an elongate piece of metallic conductor material in the form of a strip or wire. The conductor material may be bent, stamped, deformed, coined, and/or some combination thereof to pre-form the first conductor portion 146, the second conductor portion 148, and the terminal contact portion 144. After the supply buss 126 is pre-formed, the first conductor portion 146 and the second conductor portion 148 may be located proximate to the terminal 162 of each of the electronic assemblies 102. In some embodiments, the first conductor portion 146 and the second conductor portion 148 are positioned on opposite sides of each terminal 162 the electronic assemblies 102. The bonding surface area 168 of the first conductor portion 146 and the bonding surface area 168 of the second conductor portion 148 are aligned with and positioned adjacent to the bonding region 172 of the terminal 162.

In Step 206, the first conductor portion 146 and the second conductor portion 148 are resistively welded to the terminal 162. In some embodiments, a resistive welding machine (not shown) may be used to apply a mechanical force to the first conductor portion 146 and the second conductor portion 148 to place the bonding surface area 168 of the first conductor portion and the bonding surface area 168 of the second conductor portion 148 in contact with the bonding region 172 of the terminal 162. For example, referring to FIG. 7, a first weld head 176 of the resistive welding machine may apply a mechanical force at the weld head contact area 166 of the first conductor portion 146, while a second weld head 176 of the resistive welding machine applies an opposite mechanical force at the weld head contact area 166 of the second conductor portion 148 to hold the bonding surface area 168 of the second conductor portion 148 against the bonding region 172 of the terminal 162, to hold the bonding surface areas 168 of the first and second conductor portions 146 and 148 against their respective bonding regions 172 located on opposing sides of the terminal 162. An electrical current is then passed between the electrodes 176 and through the weld head contact areas 166 of the first and second conductor portions 146, 148 and the interposing terminal 162 to resistively weld the conductor portions 146, 148 to the terminal 162. As depicted, in some embodiments, the supply buss 126 may be positioned such that the terminal 162 of the electronic assemblies 102 is disposed between parallel connection regions 160 of the first conductor portion 146 and the second conductor portion 148. In this case, the terminal 162 of the electronic assemblies 102 is pinched between the terminal contact area 164 of the first conductor portion 146 and the terminal contact area 164 of the second conductor portion 148 by the opposing electrodes 176 of the welding machine.

In some embodiments, Steps 204 and 206 may precede Step 202: In such a process, the electrical buss 126 may be welded to the terminals 162 of the electronic assemblies 102 using an assembly jig (not shown) that approximates the layout of the frame 52 of the frame assembly 24, and positions the electronic assemblies for connection with the electrical buss 126. In this case, the electronic assemblies 102 are first placed on the assembly jig, and the buss 126 is then be attached to each terminal 162 as described above to form a subassembly of the electrical assemblies 102 and the connected buss 126, which is subsequently mated to the frame 52 during assembly of the electric machine 20.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An electric machine comprising:
a stator;
a rotor surrounded by the stator and being rotatable relative to the stator;
a supply terminal assembly;
an electronic module electrically connected to the stator and including a terminal having at least one bonding region; and
an electrical buss attached to the supply terminal assembly, the electrical buss including:
a first conductor portion having a connection region joined to a bonding region of the terminal of the electronic module, and a second conductor portion having a connection region joined to the bonding region of the terminal of the electronic module, the terminal of the electronic module electrically connected to the supply terminal assembly by the first and second conductor portions.

2. The electric machine of claim 1, wherein the connection region of the first conductor portion and the connection region of the second conductor portion are respectively affixed to a bonding region of the terminal of the electronic module.

3. The electric machine of claim 1, wherein the buss further comprises a terminal contact portion disposed between the first conductor portion and the second conductor portion, the terminal contact portion attached to the supply terminal assembly.

4. The electric machine of claim 3, wherein the terminal contact portion is configured to at least partially surround a supply voltage post of the supply terminal assembly.

5. The electric machine of claim 1, wherein the connection region of the first conductor portion is parallel to the connection region of the second conductor portion.

6. The electric machine of claim 1, wherein the terminal of the electronic module is disposed between the connection region of the first conductor portion and the connection region of the second conductor portion.

7. The electric machine of claim 6, wherein the connection region of the first conductor portion includes a flattened contact region and the connection region of the second conductor portion includes a flattened contact region, each flattened contact region adapted to respectively abut a bonding region of the terminal of the electronic module with surface-to-surface contact.

8. The electric machine of claim 1, wherein the first conductor portion and the second conductor portion each have a conductor section having a first cross-sectional shape and the connection regions of the first conductor portion and the second conductor portion have respective cross-sectional shapes that differ from the first cross-sectional shape.

9. The electric machine of claim 8, wherein the first cross-sectional shape is substantially circular and the cross-sectional shapes of the connection regions each have a flat portion defined by a flattened contact region adapted to respectively abut a bonding region of the terminal of the electronic module with surface-to-surface contact.

10. The electric machine of claim 1, wherein the first and second conductor portions are formed from a unitary elongate metallic conductor.

* * * * *